(12) United States Patent
Park et al.

(10) Patent No.: US 6,522,376 B1
(45) Date of Patent: Feb. 18, 2003

(54) TRANSFLECTIVE LIQUID CRYSTAL DISPLAY DEVICE AND METHOD OF MANUFACTURING THE SAME

(75) Inventors: Sung-Il Park, Kyonggi-do (KR); Tae-Wun Ko, Seoul (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/712,938

(22) Filed: Nov. 16, 2000

(30) Foreign Application Priority Data

Nov. 17, 1999 (KR) .............................. 99-51143

(51) Int. Cl.⁷ .................. G02F 1/1335; G02F 1/1343; G09G 3/36
(52) U.S. Cl. .................. 349/113; 349/62; 349/141; 349/143; 349/147; 349/138; 345/87
(58) Field of Search .................. 349/147, 62, 106, 349/138, 113, 141, 114, 143; 345/87, 88; 359/254

(56) References Cited

U.S. PATENT DOCUMENTS 4,097,131 A * 6/1978 Nishiyama ................. 349/113
6,038,008 A * 3/2000 Kim et al. .................. 349/138
6,195,140 B1 * 2/2001 Kubo et al. ................. 349/111
6,330,100 B2 * 12/2001 Van Aerle et al. ............ 349/21

* cited by examiner

Primary Examiner—William L. Sikes
Assistant Examiner—Tarifur R. Chowdhury
(74) Attorney, Agent, or Firm—Birch, Stewart, Kolasch & Birch, LLP

(57) ABSTRACT

The present invention discloses a transflective liquid crystal display device, including: a liquid crystal panel including: a) a first substrate having a color filter; b) a second substrate spaced apart from the first substrate, having a switching element, a reflective electrode, and a pixel electrode, the reflective electrode having at least one transmitting hole and reflecting ambient light, the transmitting hole transmitting light and being covered by the pixel electrode, the reflective electrode and the pixel electrode being electrically insulated each other; and c) a liquid crystal layer interposed between the upper and lower substrates; and a back light device providing light toward the transmitting hole.

15 Claims, 5 Drawing Sheets

TRANSFLECTIVE LIQUID CRYSTAL DISPLAY DEVICE AND METHOD OF MANUFACTURING THE SAME

CROSS REFERENCE

This application claims the benefit of Korean Patent Application No. 1999-51143, filed on Nov. 17, 1999, under 35 U.S.C. §119, the entirety of which is hereby incorporated by reference.

BACKGROUND OF THE INVENTION

1. Field of the Invention

The present invention relates to a liquid crystal display device, and more particularly, to a transflective liquid crystal display device and a method of manufacturing the same.

2. Description of Related Art

Liquid crystal display (LCD) devices are in wide use as display devices capable of being reduced in weight, size and thickness. In general, the LCD device includes upper and lower substrates with a liquid crystal layer interposed therebetween. The upper substrate includes a common electrode and a color filter, and the lower substrate includes a pixel electrode and TFTs. An upper polarizer is arranged on a front surface of the upper substrate, and a lower polarizer is arranged on a bottom surface of the lower substrate. A back light device is arranged under the lower substrate as a light source.

The LCD device is divided into a transmissive LCD device and a reflective LCD device. The typical transmissive LCD device displays images using light from the back light device. However, the transmissive LCD device is a non-effective light converter that merely transmits about 3% to about 8% of light from the back light device. In other words, as shown in FIG. 1, the observer gets to see about 7% of light from the back light device. Therefore, the transmissive LCD device requires a back light device having high brightness, leading to high power consumption.

In order to achieve a back light device having high brightness, sufficient power must be supplied to the back light device, thereby increaseing battery weight. However, such a back light device cannot be used for a long time.

To overcome the problems described above, the reflective LCD device has been introduced. Since the reflective LCD device is possible to use the device for a long time, and it is easy to carry due to its light weight.

FIG. 2 is a plan view illustrating a lower array substrate of a conventional reflective LCD device. As shown in FIG. 2, data lines 2 and 4 are arranged in a longitudinal direction, and gate lines 6 and 8 are arranged in a transverse direction perpendicular to the data lines 2 and 4. A reflective electrode 10 is arranged on a region defined by the gate and data lines. TFTs are arranged at a cross point of the gate and data lines. Each of the TFTs includes a gate electrode 18, a source electrode 12 and a drain electrode 14. The gate electrode 18 extends from the gate line 8, and the source electrode 12 extends from the data line 2. The drain electrode 14 is spaced apart from the source electrode 12 and contacts the reflective electrode 10 through a contact hole 16.

FIG. 3 is a cross sectional view taken along line III—III of FIG. 2. As shown in FIG. 2, the gate electrode 18 is formed on a substrate 1, and a gate insulating layer 20 is formed on the gate electrode 18 and an exposed surface of the substrate 1. A semiconductor layer 22 is formed on the gate insulating layer 20. The source and drain electrodes 12 and 14 overlap both end portions of the semiconductor layer 22. A passivation film 24 is formed over the whole surface of the substrate 1 while covering the source and drain electrodes 12 and 14. The passivation film 24 has the contact hole 16 on a portion of the drain electrode 14. The reflective electrode 10 is formed on the passivation film and contacts the drain electrode 14 through the contact hole 16. The reflective electrode is made of a reflective material having a good reflectance.

As described above, since the reflective LCD device uses ambient light other than an internal light source such as a back light device, it can be used for a long time. In other words, the reflective LCD device is driven using light reflected from the reflective electrode 10.

However, ambient light such as natural light and external light does not exist always. In other words, the reflective LCD device can be used during the day or in office where external light exists, but it can not be used during the night or in a dim place.

For the foregoing reasons, there is a need for a liquid crystal display device that its weight is light and that power consumption is low and that can be used during both the day and the night.

SUMMARY OF THE INVENTION

To overcome the problems described above, preferred embodiments of the present invention provide a transflective liquid crystal display device that can be used during both the day and the night.

In order to achieve the above object, the preferred embodiments of the present invention provide a transflective liquid crystal display device, including: a liquid crystal panel including: a) a first substrate having a color filter; b) a second substrate spaced apart from the first substrate, having a switching element, a reflective electrode, and a pixel electrode, the reflective electrode having at least one transmitting hole and reflecting ambient light, the transmitting hole transmitting light and being covered by the pixel electrode, the reflective electrode and the pixel electrode being electrically insulated from each other; and c) a liquid crystal layer interposed between the upper and lower substrates; and a back light device providing light toward the transmitting hole.

The preferred embodiment of the present invention provides a transflective liquid crystal display device, including: a first substrate; a second substrate spaced apart from the first substrate, including: a) a gate electrode formed on the second substrate: b) a first insulating layer formed over the whole surface of the second substrate and covering the gate electrode; c) a semiconductor layer formed on the first insulating layer; d) source and drain electrodes spaced apart from each other and overlapping both end portions of the semiconductor layer; e) a second insulating layer formed over the whole surface of the second substrate and covering the source and drain electrodes; f) a pixel electrode formed on the second insulating layer and contacting the drain electrode; g) a third insulating layer formed ove the whole surface of the second substrate and covering the pixel electrode; and h) a reflective electrode formed on the thrid insulating layer and having at least one transmitting hole, the transmitting hole being covered by the pixel electrode; and a liquid crystal layer interposed between the first and second substrates.

The preferred embodiment of the present invention provides a method of manufacturing an array substrate of a transflective liquid crystal display device, the method including: forming a gate electrode on the substrate forming a first insulating layer, over the whole surface of the substrate while covering the gate electrode; forming a semiconductor layer on the first insulating layer; forming source and drain electrodes, the source and drain electrodes being spaced apart from each other and overlapping both end portions of the semiconductor layer; forming a second insulating layer over the whole surface of the substrate while covering the source and drain electrodes; forming a pixel electrode on the second insulating layer, the pixel electrode contacting the drain electrode; forming a third insulating layer over the whole surface of the substrate while covering the pixel electrode; and forming a reflective electrode on the third insulating layer, the reflective electrode having at least one transmitting hole, the transmitting hole being covered by the pixel electrode.

The reflective electrode is a made of an opaque metal. The pixel electrode is made of one of ITO and IZO. The first and third insulating layers are made of SiNx or $SiO_2$. The second insulating layer is made of BCB (benzocyclobutene). The reflective electrode and the pixel electrode are electrically insulated by an insulating layer.

As described herein before, since the transflective LCD device according to the preferred embodiment of the present invention has both the reflective mode and the transmissive mode, it can be used in anytime and it everywhere regardless of a time and a place.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to a preferred embodiment of the present invention, example of which is illustrated in the accompanying drawings.

Figure 1:
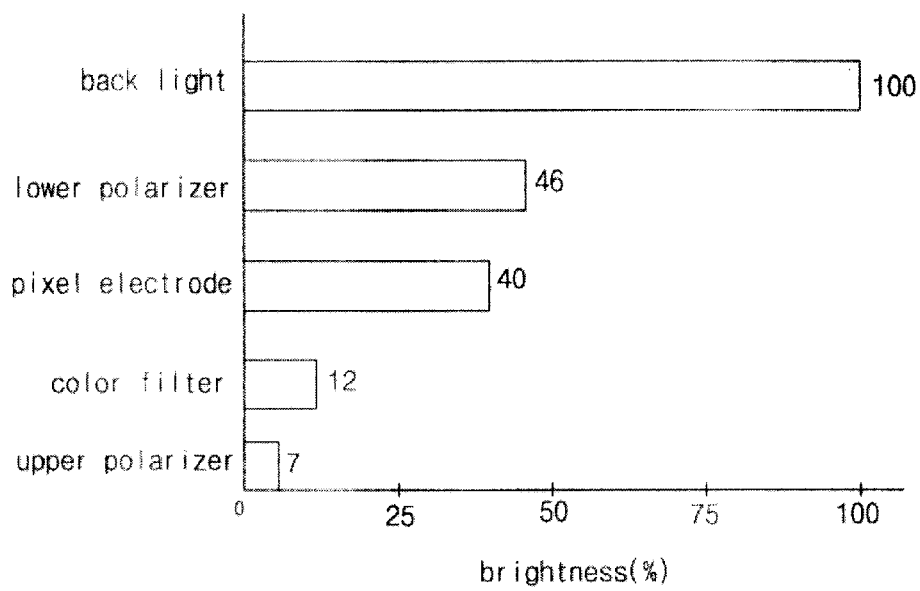
FIG. 1 is a graph illustrating transmittance after light passes through each layer of a conventional liquid crystal display device.
Figure 2:
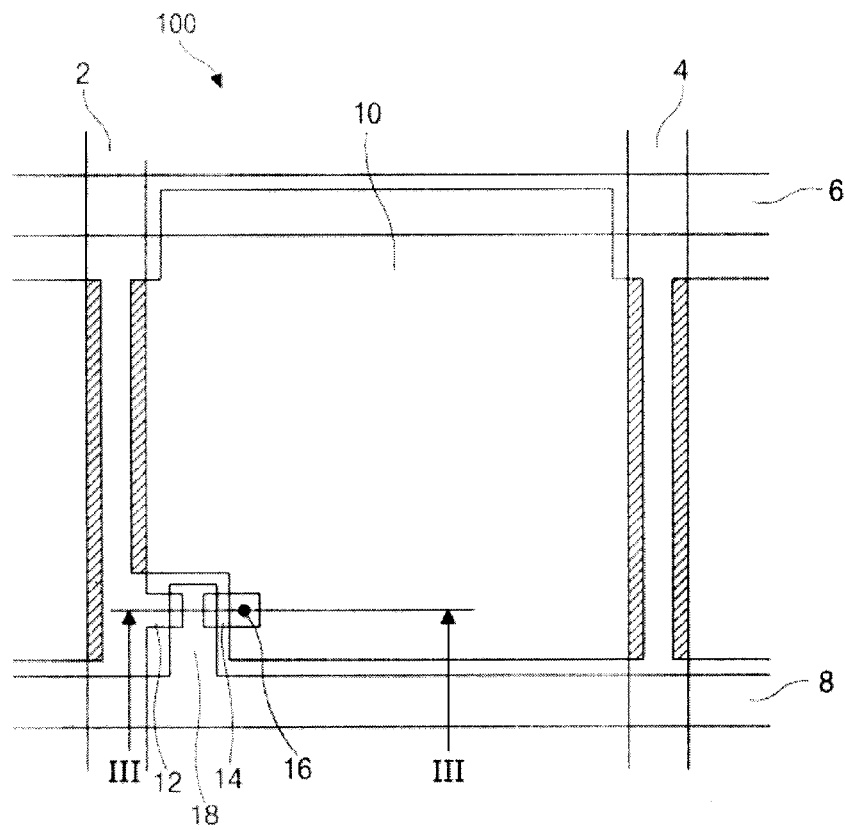
FIG. 2 is a plan view illustrating a lower array substrate of a conventional reflective LCD device.
Figure 3:
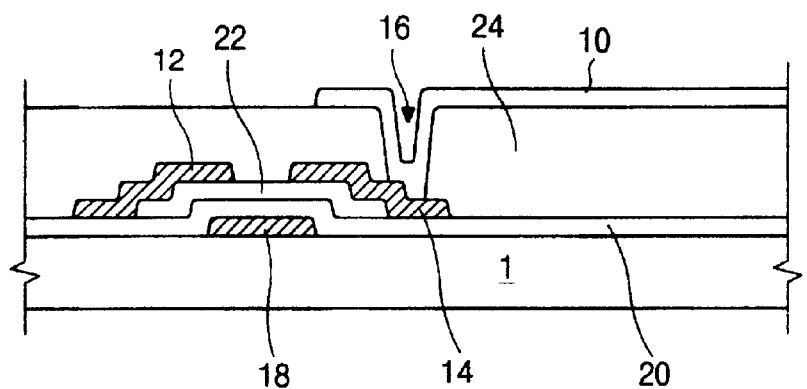
FIG. 3 is a cross sectional view taken along line—of FIG. 2.
Figure 4:
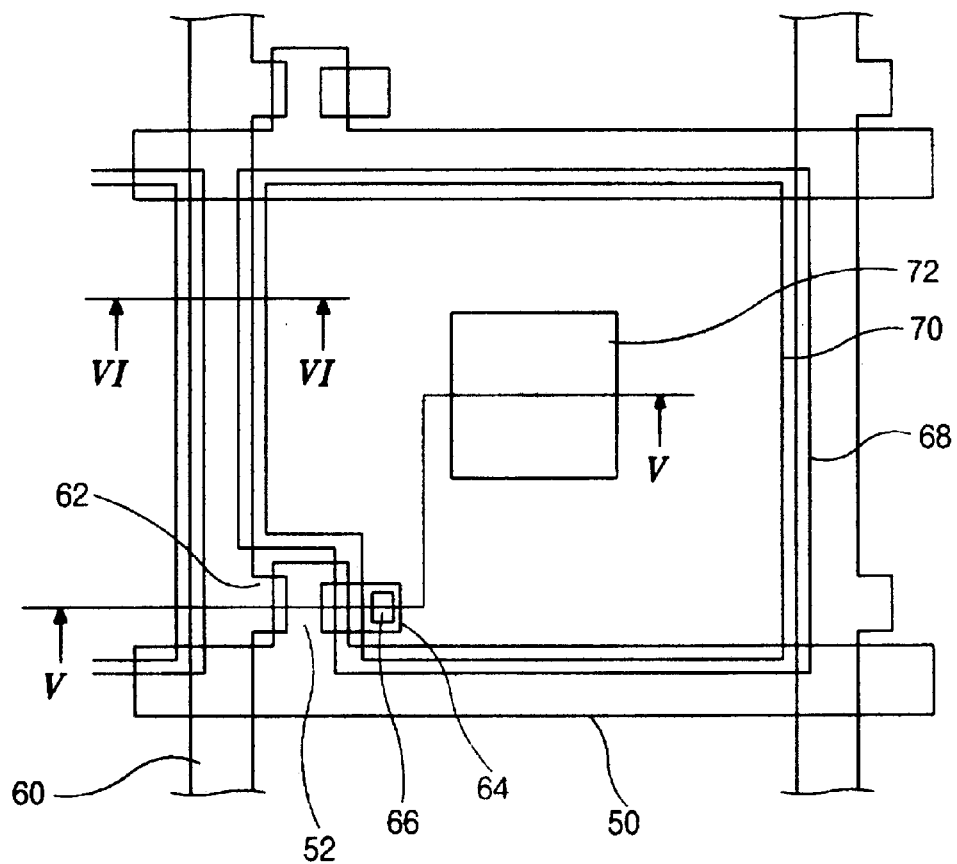
FIG. 4 is a plan view illustrating a transflective liquid crystal display device according to the preferred embodiment of the present invention.

FIG. 4 is a plan view illustrating a transflective liquid crystal display device according to the preferred embodiment of the present invention. As shown in FIG. 4, gate lines 50 are arranged in a transverse direction, and data lines 60 are arranged in a longitudinal direction perpendicular to the gate lines 50. TFTs are arranged at a cross point of the gate and data lines. Each of the TFTs includes a gate electrode 52, a source electrode 62 and a drain electrode 64. The gate electrode 52 extends from the gate line 50, and the source electrode 62 extends from the data line 60. The drain electrode 64 is spaced apart from the source electrode 62. A pixel electrode 70 is arranged on a region defined by the gate and data lines 50 and 60 and contacts the drain electrode 64 through a contact hole 66. A reflective electrode 68 is arranged to cover the pixel electrode 70. The reflective electrode 68 includes a transmitting hole 72 located at its central portion. The reflective electrode 68 and the pixel electrode 70 are made of a different material from each other. In other words, the reflective electrode 68 is made of an opaque metal, while the pixel electrode 70 is made of a transparent conductive material.

The reflective electrode 68 overlaps a portion of the gate and data lines 50 and 60 in order to improve an aperture ratio. The pixel electrode 70 overlaps a portion of the gate line 50. Preferably, the transmitting hole 72 has a rectangular shape. According to use of the inventive transflective LCD, the number and size of the transmitting hole 72 and size of the reflective electrode 68 can be adjusted. Therefore, size, number and shape of the transmitting hole 72 are limited by the present invention.

At this point, the reflective electrode 68 is electrically independent from the pixel electrode 70. In other words, an insulating layer (not shown) is interposed between the reflective electrode 68 and the pixel electrode 70. In a reflective mode using the reflective electrode 68, the transflective LCD device is driven by electric field excited by the pixel electrode 70.

FIGS. 5A to 5D are cross-sectional view taken along line V—V of of FIG. 4, illustrating a process of manufacturing a lower array substrate of the transflective LCD device according to the preferred embodiment of the present invention.

Figure 5A:
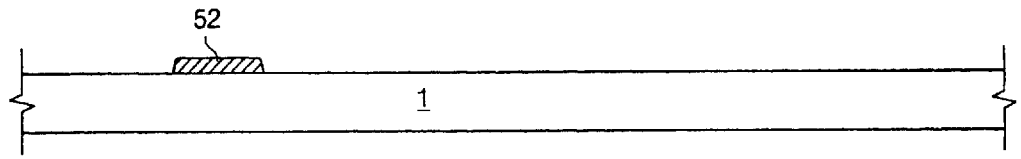
FIGS. 5A to 5D are cross-sectional views taken along line V—V of FIG. 4, illustrating a process of manufacturing a lower array substrate of the transflective LCD device according to the preferred embodiment of the present invention.

First, as shown in FIG. 5A, the gate electrode 52 is formed on a substrate 1. The gate electrode 52 is made of a metal having a high corrosion resistance such as Cr, W or the like and a low resistive aluminum alloy.

Figure 5B:
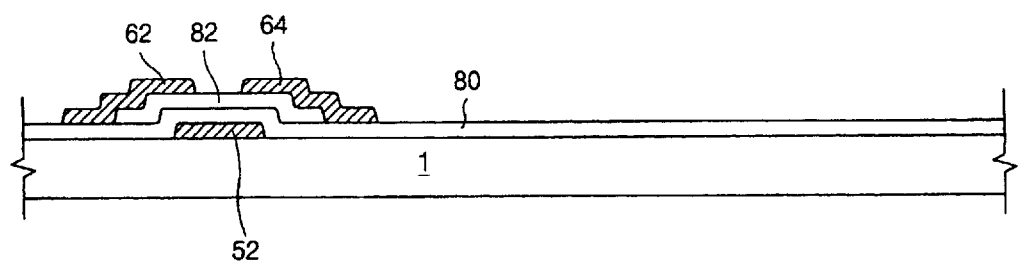

Next, as shown in FIG. 5B, a gate insulating layer 80 is formed over the whole surface of the substrate 1 while covering the gate electrode 52. A semiconductor layer 82 is formed on the gate insulating layer 80. Thereafter, the source and drain electrodes 62 and 64 are formed to overlap both end portions of the semiconductor layer 80.

Figure 5C:
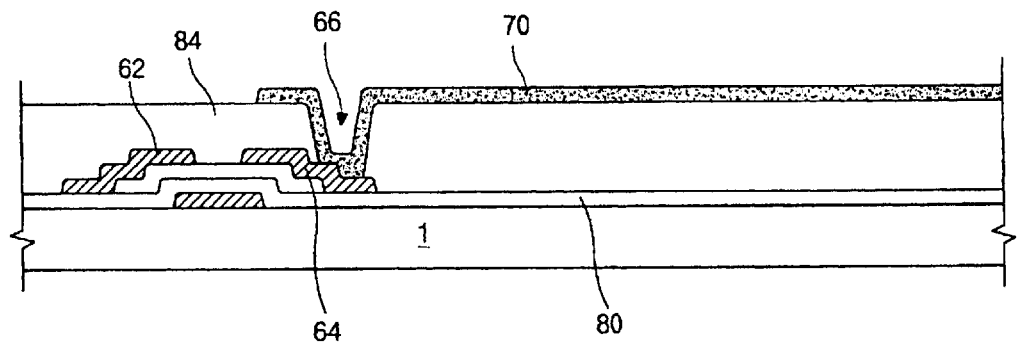

Subsequently, as shown in FIG. 5C, a passivation film 84 is formed over the whole surface of the substrate 1 while covering the source and drain electrodes 62 and 64. The passivation film 84 includes the contact hole 66 that exposes a portion of the drain electrode 64. The passivation film 84 is preferably made of a material that is excellent in light transmittance and moisture resistance, for example, BCB (benzocyclobutene). Then, the pixel electrode 70 is formed on the passivation film 84 and contacts the drain electrode 64 through the contact hole 66. The pixel electrode 70 is made of a material having a high light transmittance such as ITO (indium tin oxide) and IZO (indium zinc oxide).

Figure 5D:
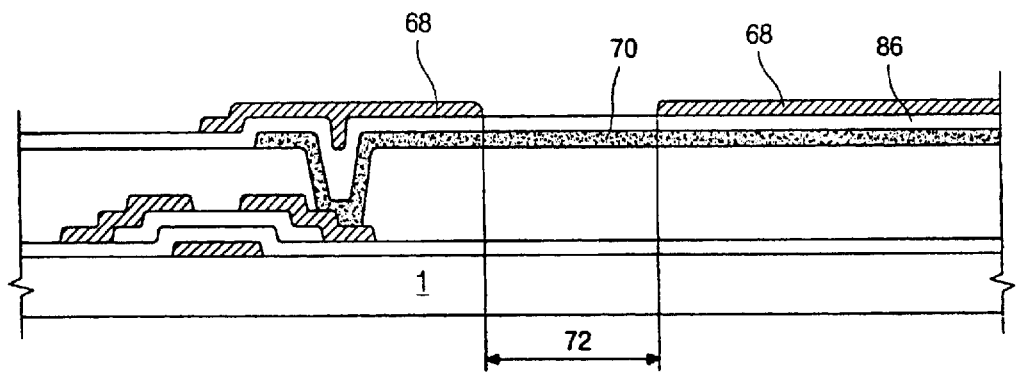

Finally, as shown in FIG. 5D, an inter-layer insulator 86 is formed over the whole surface of the substrate 1 while covering the pixel electrode 70. The inter-layer insulator 86 is made of, for example, SiNx. Thereafter, the reflective electrode 68 is formed on the inter-layer insulator 86. The reflective electrode 68 has a transmitting hole 72. Therefore, most of important components of the lower array substrate are completed.

Figure 6:
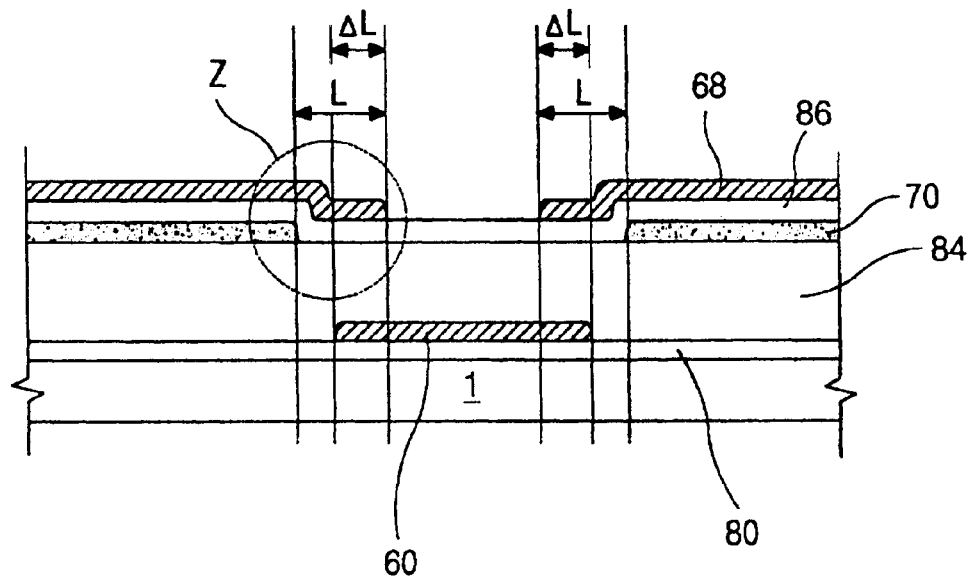
FIG. 6 is a cross-sectional view taken along line VI—VI of FIG. 4.

FIG. 6 is a cross-sectional view taken along line VI—VI of FIG. 4. As shown in FIG. 6, the gate insulating layer 80 is formed on the substrate 1, and the data line 60 is formed on the gate insulating layer 80. The passivation film 84 is formed over the whole surface of the substrate 1 while covering the data line 60. The two adjacent pixel electrodes 70 are formed not to overlap the data line 60. In other words, there is an interval between the data line 60 and the pixel electrode 70, which are transversely distant from each other. The inter-layer insulator 86 is formed over the whole surface of the substrate 1 while covering the pixel electrode 70. The reflective electrode 68 is formed on the interlayer insulator 86 to transversely overlap both end portions of the data line 60. In other words, the reflective electrode 68 overlaps as far as a predetermined distance AL from both end portions of the data line 60. Preferably, the reflective electrode 68 covers all portions of the pixel electrode 70. At this point, the reflective electrode 68 and the pixel electrode 70 are electrically not connected with each other by the inter-layer insulator 86. Further, there is a portion where the reflective electrode 68 and the pixel electrode 70 overlap each other. In other words, the reflective electrode 68 and the pixel electrode 70 do not overlap as a length L.

The pixel electrode 70 is electrically connected with the drain electrode 64 and thus can receive electrical signals from the TFT, whereas the reflective electrode 68 is independent from the pixel electrode 70 and therefore can not receive electrical signals. Therefore, in order to apply electrical signals to the reflective electrode 68, electrical signals applied to the pixel electrode 70 from the TFT, i.e., electric field, are used.

Figure 7:
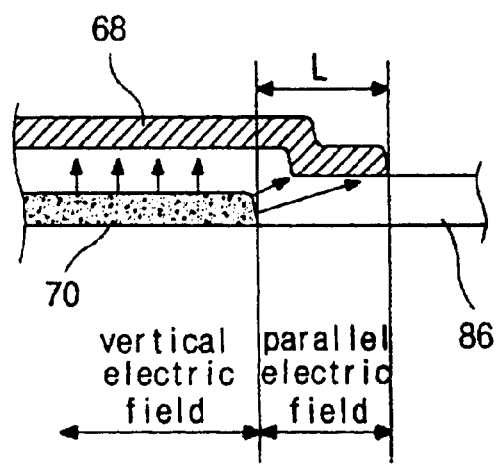
FIG. 7 is an enlarged view of a portion "Z" of FIG. 6.

FIG. 7 is an enlarged view of a portion "Z" of FIG. 6. As shown in FIG. 7, a portion of the reflective electrode 68 overlapping the pixel electrode 70 is driven by vertical electric field, and a portion "L" of the reflective electrode 68 not overlapping the pixel electrode 70 is driven by parallel electric field.

Figure 8:
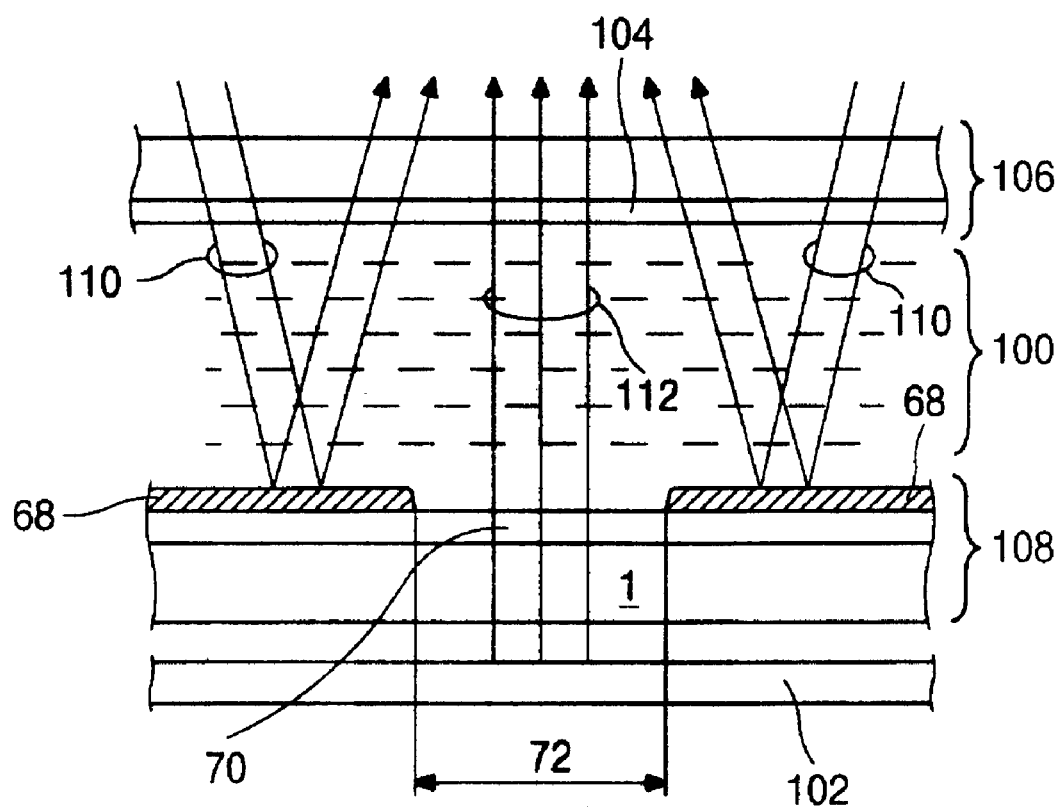
FIG. 8 is a schematic view illustrating the inventive transflective LCD device.

FIG. 8 is a schematic view illustrating the inventive transflective LCD device. As shown in FIG. 8, the inventive transflective LCD device includes a liquid crystal panel having a back light device 102. The liquid crystal panel includes upper and lower substrates 106 and 108 with a liquid crystal layer 100 interposed therebetween. The upper substrate 106 includes a color filter 104 and a common electrode (not shown). The lower substrate 108 includes a switching element (not shown), the reflective electrode 68 and the pixel electrode 70. Even though not shown, the inter-layer insulator is substantially interposed between the reflective electrode 68 and the pixel electrode 70. The reflective electrode 68 is made of a conductive material having a high reflectance to reflect ambient light 110, and is substantially an opaque metal. The reflective electrode 68 includes the transmitting hole 72. The transmitting hole 72 serves to transmit light from the back light device 102. As described above, the transmitting hole 72 does not have a limitation in location, size, number, and shape. The pixel electrode 70 has an area large enough to cover the transmitting hole 72.

Hereinafter, an operation of the transflective LCD device according to the preferred embodiment of the present invention is explained below in detail.

First, when the transflective LCD device is in a reflective mode, the reflective electrode 68 reflects ambient light 110 toward the upper substrate 106. At this time, electrical signals from the switching element are applied to the reflective electrode 68, and thus a phase of the liquid crystal layer 100 varies, leading to variation in the amount of reflected light. Reflected light is colored by the color filter 104, whereby signals applied to the reflective electrode 68 are displayed as images.

Alternatively, when the transflective LCD device is in a transmissive mode, light generated from the back light device 102 transmits through a portion of the pixel electrode 70 corresponding to the transmitting hole 72. At this time, similar to the reflective mode, when electrical signals from the switching element are applied to the pixel electrode 70, a phase of the liquid crystal layer 100 varies. Light transmitting the liquid crystal layer 100 is colored by the color filter 104, whereby signals applied to the pixel electrode 70 are displayed as color images.

As described herein before, since the transflective LCD device according to the preferred embodiment of the present invention has both a reflective mode and a transmissive mode, it can be used anytime, anywhere, regardless of the time or place.

While the invention has been particularly shown and described with reference to first preferred embodiment s thereof, it will be understood by those skilled in the art that the foregoing and other changes in form and details may be made therein without departing from the spirit and scope of the invention.

What is claimed is:

1. A transflective liquid crystal display device, comprising:
   a liquid crystal panel including:
   a) a first substrate having a color filter;
   b) a second substrate spaced apart from the first substrate, having a switching element, a reflective electrode, a data line, a gate line and a pixel electrode, the reflective electrode having at least one transmitting hole and reflecting ambient light, the transmitting hole transmitting light and being covered by the pixel electrode, the reflective electrode and the pixel electrode being electrically insulated from each other, the reflective electrode overlapping a portion of the data line, and the pixel electrode overlapping a portion of the gate line, wherein a portion of the reflective electrode not overlapping the pixel electrode is driven by a parallel electric field, and a portion of the reflective electrode overlapping the pixel electrode is driven by a vertical electric field; and
   c) a liquid crystal layer interposed between the upper and lower substrates; and
   a back light device providing light toward the transmitting hole.

2. The device of claim 1, wherein the reflective electrode is made of an opaque metal.

3. The device of claim 1, wherein the pixel electrode is made of a conductive transparent material.

4. The device of claim 3, wherein the conductive transparent material is one of ITO or IZO.

5. The device of claim 1, wherein the reflective electrode and the pixel electrode are electrically insulated by an insulating layer.

6. A transflective liquid crystal display device, comprising:
   a first substrate;
   a second substrate spaced apart from the first substrate, including:
   a) a gate electrode formed on the second substrate;
   b) a first insulating layer formed over the whole surface of the second substrate and covering the gate electrode;

c) a semiconductor layer formed on the first insulating layer;

d) source and drain electrodes spaced apart from each other and overlapping both end portions of the semiconductor layer;

e) a second insulating layer formed over the whole surface of the second substrate and covering the source and drain electrodes;

f) a pixel electrode formed on the second insulating layer and contacting the drain electrode;

g) a third insulating layer formed over the whole surface of the second substrate and covering the pixel electrode;

h) a reflective electrode formed on the third insulating layer and having at least one transmitting hole, the transmitting hole being covered by the pixel electrode, wherein a portion of the reflective electrode not overlapping the pixel electrode is driven by a parallel electric field, and a portion of the reflective electrode overlapping the pixel electrode is driven by a vertical electric field; and i) a gate line and a data line, the reflective electrode overlapping a portion of the data line, and the pixel electrode overlapping a portion of the gate line; and a liquid crystal layer interposed between the first and second substrates.

7. The device of claim 6, wherein the reflective electrode is a made of an opaque metal.

8. The device of claim 6, wherein the pixel electrode is made of one of ITO or IZO.

9. The device of claim 6, wherein the first and third insulating layers are made of SiNx or $SiO_2$.

10. The device of claim 6, wherein the second insulating layer is made of BCB (benzocyclobutene).

11. A method of manufacturing an array substrate of a transflective liquid crystal display device, the method comprising:

forming a gate electrode having a gate line on the substrate;

forming a first insulating layer over the whole surface of the substrate while covering the gate electrode;

forming a semiconductor layer on the first insulating layer;

forming source and drain electrodes, the source electrode having a data line, the source and drain electrodes being spaced apart from each other and overlapping both end portions of the semiconductor layer;

forming a second insulating layer over the whole surface of the substrate while covering the source and drain electrodes;

forming a pixel electrode on the second insulating layer, the pixel electrode contacting the drain electrode;

forming a third insulating layer over the whole surface of the substrate while covering the pixel electrode; and forming a reflective electrode on the third insulating layer, the reflective electrode having at least one transmitting hole, the transmitting hole being covered by the pixel electrode, wherein the reflective electrode overlaps a portion of the data line, and the pixel electrode overlaps a portion of the gate line, and a portion of the reflective electrode not overlapping the pixel electrode is driven by a parallel electric field, and a portion of the reflective electrode overlapping the pixel electrode is driven by a vertical electric field.

12. The device of claim 11, wherein the reflective electrode is a made of an opaque metal.

13. The device of claim 11, wherein the pixel electrode is made of one of ITO or IZO.

14. The device of claim 11, wherein the first and third insulating layers are made of SiNx or $SiO_2$.

15. The device of claim 11, wherein the second insulating layer is made of BCB (benzocyclobutene).

* * * * *